United States Patent
Zhou et al.

(10) Patent No.: US 11,039,126 B2
(45) Date of Patent: Jun. 15, 2021

(54) ABNORMALITY DETECTION METHOD, NETWORK VIDEO RECORDER (NVR), AND VIDEO SERVER

(71) Applicant: ZHEJIANG UNIVIEW TECHNOLOGIES CO., LTD., Hangzhou (CN)

(72) Inventors: Di Zhou, Hangzhou (CN); Chaohua Du, Hangzhou (CN)

(73) Assignee: ZHEJIANG UNIVIEW TECHNOLOGIES CO., LTD.

( * ) Notice: Subject to any disclaimer, the term of this patent is extended or adjusted under 35 U.S.C. 154(b) by 0 days.

(21) Appl. No.: 16/487,739

(22) PCT Filed: Aug. 16, 2017

(86) PCT No.: PCT/CN2017/097685
§ 371 (c)(1),
(2) Date: Aug. 21, 2019

(87) PCT Pub. No.: WO2018/161503
PCT Pub. Date: Sep. 13, 2018

(65) Prior Publication Data
US 2020/0029070 A1 Jan. 23, 2020

(30) Foreign Application Priority Data
Mar. 10, 2017 (CN) .......................... 201710142753.X

(51) Int. Cl.
*H04N 17/06* (2006.01)
(52) U.S. Cl.
CPC .................................. *H04N 17/06* (2013.01)
(58) Field of Classification Search
CPC .......... H04N 1/00002; H04N 1/00005; H04N 1/00029; H04N 5/77; H04N 5/775;
(Continued)

(56) References Cited

U.S. PATENT DOCUMENTS 7,167,986 B2 * 1/2007 Hughes ................. H04L 9/3247
713/176
8,418,194 B2 * 4/2013 Howarter ............ H04L 41/0896
725/14
(Continued)

FOREIGN PATENT DOCUMENTS

CN 101340567 A 1/2009
CN 102014141 A 4/2011
(Continued)

OTHER PUBLICATIONS

International Search Report and Written Opinion for PCT/CN2017097685 dated Dec. 6, 2017.
(Continued)

*Primary Examiner* — Tri H Phan
(74) *Attorney, Agent, or Firm* — Dinsmore & Shohl LLP

(57) ABSTRACT

Disclosed are an abnormality detection method, a network video recorder (NVR) and a video server. The method includes: an NVR receiving first keep-alive information from a front-end apparatus, the first keep-alive information carries first verification information, and the first verification information is generated according to a process run by the front-end apparatus while sending the first keep-alive information; the NVR carrying the first verification information in second keep-alive information, and sending the same to the video server; the video server determining, according to the first verification information and second verification information of the front-end apparatus, whether an abnormality has occurred in the front-end apparatus, the second verification information is generated according to a process run by the front-end apparatus in a normal operation status.

18 Claims, 3 Drawing Sheets

(58) Field of Classification Search
CPC ...... H04N 5/781; H04N 7/0357; H04N 17/00; H04N 17/002; H04N 17/004; H04N 17/02; H04N 17/04; H04N 17/045; H04N 17/06; H04N 21/442; H04N 21/2404; H04N 21/4425; H04N 2017/006; H04N 2017/008; G06F 11/00; G06F 11/07; G06F 11/30
See application file for complete search history.

(56) References Cited

U.S. PATENT DOCUMENTS

| | | | | |
|---|---|---|---|---|
| 8,667,302 | B2* | 3/2014 | Yoshioka | H04N 5/77 713/189 |
| 8,976,262 | B2* | 3/2015 | Ho | H04L 63/10 348/222.1 |
| 9,503,674 | B2* | 11/2016 | Chung | H04N 5/77 |
| 10,204,275 | B2* | 2/2019 | Shin | H04N 9/8211 |
| 10,614,701 | B2* | 4/2020 | Berlic | G08B 29/18 |
| 2009/0031407 | A1* | 1/2009 | Kuang | G06F 21/31 726/7 |
| 2012/0124444 | A1 | 5/2012 | Husted et al. | |
| 2012/0174222 | A1 | 7/2012 | Peng et al. | |
| 2014/0211764 | A1 | 7/2014 | Sundararajan et al. | |
| 2019/0303850 | A1* | 10/2019 | Mangos | G01D 9/00 |

FOREIGN PATENT DOCUMENTS

| | | |
|---|---|---|
| CN | 103974032 A | 8/2014 |
| CN | 104010052 A | 8/2014 |
| CN | 104010552 A | 8/2014 |
| CN | 104639352 A | 5/2015 |
| CN | 104969654 A | 10/2015 |
| CN | 105847247 A | 8/2016 |
| CN | 107040742 A | 8/2017 |

OTHER PUBLICATIONS

First Office Action for CN201710142753.X dated May 5, 2019.
First Search of Priority Document for CN201710142753.X dated Mar. 10, 2017.
Notification to Grant Patent Right for Invention CN201710142753.X dated Jul. 18, 2019.

* cited by examiner

ABNORMALITY DETECTION METHOD, NETWORK VIDEO RECORDER (NVR), AND VIDEO SERVER

CROSS-REFERENCE TO RELATED APPLICATIONS

This application is a National Phase entry of International Patent Application No. PCT/CN2017/097685 filed Aug. 16, 2017, which claims priority to Chinese Patent Application No. CN201710142753.X, filed with the Chinese Patent Office on Mar. 10, 2017, entitled "Abnormality Detection Method and Network Video Recorder (NVR)", the contents of which are incorporated herein by reference in its entirety.

TECHNICAL FIELD

The present disclosure relates to the field of video surveillance, and in particular to an abnormality detection method. The present disclosure also relates to a network video recorder (NVR) and a video server.

BACKGROUND ART

Video surveillance (Cameras and Surveillance) is an important constituent part of a security protection system, and video surveillance is widely used in many occasions because of its visuality, accuracy, timeliness, and rich information content. A video surveillance system comprises a front-end camera, a transmission cable, and a video surveillance platform, wherein the camera can be divided into a network digital camera and an analog camera and can be used for capturing video image signals at the front end.

In recent years, with the development of video surveillance technologies, the integration and coordination of video surveillance and video conferences is realized by the video surveillance system, and remote devices can be flexibly and effectively managed. Applications such as coordinated alarm, formulation of a monitoring strategy, emergency commanding are realized based on video recording and playback of an object to be remotely monitored, and other, the dual functions of surveillance and communication are achieved, which can fully meet requirements for remote monitoring and emergency commanding in various fields such as transportation, water conservancy, oil field, banking, and telecommunications.

However, as video surveillance is used more and more widely, users are paying more and more attention to their privacy. How to ensure the security of video surveillance cameras over a network has become an issue of public concern. This not only involves the privacy of home users, but may also cause up to millions of IPCs to be used as devices for hacking, which may cause paralysis of the entire network.

In the prior art, in general, a video management server actively initiates an query about an running status of a front-end device, and after an abnormal process is discovered, the server prevents the abnormal device from being connected to the monitoring system by means of alarming or prohibiting an access of the abnormal device. However, during the implementation of the present disclosure, inventors have found that the current video surveillance system basically adopts a dual-network-interface-card dual-IP (Internet Protocol) scheme for an NVR (Network Video Recorder) shown in FIG. 1, wherein one of the two IPs of the NVR is connected to a video management platform, and the other one IP is connected to some IPCs (IP Cameras) subordinate to the NVR to prevent a huge number of IPCs from being directly exposed to the network video management platform. In this way, although the video management platform is responsible for carrying out the security management, the video server cannot directly and actively acquire the running is status of each IPC. If a lawbreaker hacks the IPC, the server will not be able to acquire the running status of the front end, and the abnormality cannot be timely discovered, and moreover the lawbreaker can easily spoof the server by capturing a package and falsifying information, thereby causing a potential hazard to the security.

SUMMARY

The present disclosure provides an abnormality detection method for solving the problem that the video server in the existing video surveillance system cannot timely know whether an abnormality has occurred in a front-end device, with the method being applicable to a video surveillance system comprising a video server, an NVR, and a front-end device, comprising:

receiving, by the NVR, first keep-alive information from the front-end device, wherein the first keep-alive information carries first verification information, and the first verification information is generated according to processes (or threads) run by the front-end device when sending the first keep-alive information;

sending, by the NVR, the first verification information to the video server, with the first verification information carried in second keep-alive information; and determining, by the video server, according to the first verification information and second verification information on the front-end device, whether an abnormality has occurred in the front-end device, wherein the second verification information is generated according to processes run by the front-end device in a normal running status.

Optionally, the method further comprises steps of:

calculating the first verification information by the front-end device; and calculating the second verification information by the video server.

Optionally, in a case where a moment at which the front-end device sends the first keep-alive information is used as sending time, the step of calculating the first verification information by the front-end device comprises:

generating, by the front-end device, the first verification information by using a hash operation according to the sending time, device feature information on the front-end device, and first process feature information, wherein the first process feature information is corresponding to processes run by the front-end device when sending the first keep-alive information.

Optionally, in a case where a moment at which the front-end device sends the first keep-alive information is used as sending time, the step of calculating the second verification information by the video server includes:

generating, by the video server, the second verification information by using a hash operation according to the sending time, the device feature information, and second process feature information, wherein the second process feature information is corresponding to processes running on the front-end device in a normal running status.

Optionally, the types of the process include basic processes and dynamic processes, wherein the first process feature information and the second process feature information are generated after a hash operation is performed according to the sorted process status information on the basic processes and process status information on the dynamic processes.

Optionally, before the step of receiving by the NVR first keep-alive information from the front-end device, the method further comprises:

acquiring, by the NVR, the second process feature information on the front-end device;

saving, by the NVR, the second process feature information and device feature information on the front-end device corresponding to the second process feature information, where the second process feature information and the device feature information are reported when the front-end device registers with the NVR for the first time after the front-end device is discovered by the NVR;

sending, by the NVR, the device feature information and the second process feature information to the video server while pushing the front-end device to the video server; and performing, by the NVR, time synchronization with the front-end device and the video server.

Optionally, the second keep-alive information further includes the sending time and an ID of the front-end device, a corresponding relation between the ID, the device feature information and the second process feature information on the front-end device is stored in the video server, and the step of determining by the video server according to the first verification information and second verification information on the front-end device, whether an abnormality has occurred in the front-end device comprises steps of:

extracting the ID and the sending time carried in the second keep-alive information;

generating the second verification information by using the sending time, and the device feature information and the second process feature information corresponding to the ID;

judging whether the first verification information matches the second verification information;

wherein if the first verification information matches the second verification information, confirming that the front-end device is running normally; and if the first verification information and the second verification information do not match with each other, confirming that an abnormality has occurred in the front-end device.

The present application further provides an abnormality detection method, which is applicable to a network video recorder (NVR) that is in communication with a video server and a front-end device, the method comprising steps of:

receiving, by the NVR, first keep-alive information from the front-end device, wherein the first keep-alive information carries first verification information, and the first verification information is generated according to processes run by the front-end device when sending the first keep-alive information;

sending, by the NVR, the first verification information to the video server, with the first verification information carried in second keep-alive information, so that the video server determines, according to the first verification information and second verification information on the front-end device, whether an abnormality has occurred in the front-end device;

wherein the second verification information is generated according to processes running on the front-end device in a normal running status.

Optionally, the method further comprises steps of:

acquiring, by the NVR, second process feature information on the front-end device, and saving the second process feature information and the device feature information on the front-end device corresponding to the second process feature information, wherein the device information is reported when the front-end device registers with the NVR for the first time after the front-end device is discovered by the NVR;

sending, by the NVR, the device feature information and the second process feature information to the video server while pushing the front-end device to the video server;

performing, by the NVR, time synchronization with the front-end device and the video server.

The present application further provides an abnormality detection method, which is applicable to a video server that is in communication with a front-end device and a network video recorder (NVR), wherein a corresponding relation between an ID, device feature information, and second process feature information on the front-end device is stored in the video server, the method comprising steps of:

extracting, by the video server, when second keep-alive information from the NVR is received, an ID and first verification information carried in the second keep-alive information, wherein the first verification information is generated according to processes run by the front-end device when sending the first keep-alive information;

generating, by the video server, the second verification information by using the device feature information and the second process feature information corresponding to the ID; and judging, by the video server, whether the first verification information matches the second verification information, and confirming that the front-end device is running normally if the judgment result is yes, and confirming that an abnormality has occurred in the front-end device if the judgment result is no.

Optionally, the method further comprises:

pre-storing a corresponding relation between the ID, the device feature information, and the second process feature information on the front-end device in the video server, wherein the second process feature information is corresponding to processes running on the front-end device in a normal running status, and the device feature information is corresponding to device information on the front-end device.

Optionally, in a case where a moment at which the front-end device sends the first keep-alive information is used as sending time, the method further comprises steps of:

generating, by the video server, the second verification information by using a hash operation according to the sending time, the device feature information, and the second process feature information, wherein the second process feature information is corresponding to processes running on the front-end device in a normal running status.

The present application further provides a network video recorder (NVR), which is applicable to a video surveillance system comprising a video server, the NVR, and a front-end device, the NVR comprising:

a receiving module configured to receive first keep-alive information from the front-end device, wherein the first keep-alive information carries first verification information, and the first verification information is generated according to processes run by the front-end device when sending the first keep-alive information; and a sending module configured to send the first verification information to the video server with the first verification information carried in second keep-alive information, so that the video server determines, according to the first verification information and second verification information on the front-end device, whether an abnormality has occurred in the front-end device;

wherein the second verification information is generated according to processes running on the front-end device in a normal running status.

Optionally, the NVR further comprises:

an initialization module configured to acquire second process feature information on the front-end device, and save device feature information on the front-end device corresponding to the second process feature information, wherein the second process feature information and the device feature information are reported when the front-end device registers with the NVR for the first time after the front-end device is discovered by the NVR;

a pushing module configured to send the device feature information and the second process feature information to the video server while pushing the front-end device to the video server; and a synchronization module configured to perform time synchronization with the front-end device and the video server.

Correspondingly, the present application further provides a video server, which is applicable to a video surveillance system comprising a network video recorder (NVR), the video server, and a front-end device, and the video server comprises:

a storage module configured to store a corresponding relation between an ID, device feature information, and second process feature information on the front-end device, wherein the second process feature information is corresponding to processes running on the front-end device in a normal running status, and the device feature information is corresponding to device information on the front-end device;

an extraction module configured to extract, when second keep-alive information from the NVR is received, an ID and first verification information carried in the second keep-alive information, wherein the first verification information is generated according to processes run by the front-end device when sending the first keep-alive information;

a generation module configured to generate the second verification information by using the device feature information and process feature information corresponding to the ID; and a judgment module configured to judge whether the first verification information matches the second verification information, and confirm that the front-end device is running normally if the judgment result is yes, and confirm that an abnormality has occurred in the front-end device if the judgment result is no.

The present application further provides a video server, which is applicable to a video surveillance system comprising a network video recorder (NVR), the video server, and a front-end device, wherein a corresponding relation between an ID, device feature information, and second process feature information on the front-end device is stored in the video server, the video server comprising:

an extraction module configured to extract, when second keep-alive information from the NVR is received, an ID and first verification information carried in the second keep-alive information, wherein the first verification information is generated according to processes run by the front-end device when sending the first keep-alive information;

a generation module configured to generate the second verification information by using the device feature information and the second process feature information corresponding to the ID; and a judgment module configured to judge whether the first verification information matches the second verification information, and confirm that the front-end device is running normally when the judgment result is yes, and confirm that an abnormality has occurred in the front-end device when the judgment result is no.

Optionally, the video server further comprises:

a storage module configured to pre-store the corresponding relation between the ID, the device feature information, and the second process feature information on the front-end device in the video server, wherein the second process feature information is corresponding to processes running on the front-end device in a normal running status, and the device feature information is corresponding to device information on the front-end device.

Optionally, the video server further comprises an operation module, wherein in a case where a moment at which the front-end device sends the first keep-alive information is used as sending time, the operation module generates the second verification information by a hash operation according to the sending time, the device feature information, and the second process feature information, wherein the second process feature information is corresponding to processes running on the front-end device in a normal running status.

The present disclosure further provides a network video recorder (NVR), which is applied to a video surveillance system comprising a video server, the NVR, and a front-end device, wherein the NVR comprises: a processor and a memory, the memory is coupled to the processor, instructions are stored in the memory, when the instructions are executed by the processor, the NVR is caused to execute following operations:

receiving first keep-alive information from the front-end device, wherein the first keep-alive information carries first verification information, and the first verification information is generated according to processes run by the front-end device when sending the first keep-alive information;

sending the first verification information to the video server with the first verification information carried in second keep-alive information, so that the video server determines, according to the first verification information and second verification information on the front-end device, whether an abnormality has occurred in the front-end device;

wherein the second verification information is generated according to processes running on the front-end device in a normal running status.

Optionally, the NVR further executes following operations:

acquiring second process feature information on the front-end device, and saving the second process feature information and the device feature information on the front-end device corresponding to the second process feature information, wherein the second process feature information and the device feature information are reported when the front-end device registers with the NVR for the first time after the front-end device is discovered by the NVR;

sending the device feature information and the second process feature information to the video server while pushing the front-end device to the video server;

performing time synchronization with the front-end device and the video server.

The present disclosure further provides a video server, which is applicable to a video surveillance system comprising a network video recorder (NVR), the video server, and a front-end device, wherein the video server comprises: a processor and a memory, the memory is coupled to the processor, instructions are stored in the memory storing, and when the instructions are executed by the processor, the video server is caused to execute following operations:

extracting, when second keep-alive information from the NVR is received, an ID and first verification information carried in the second keep-alive information, wherein the first verification information is generated according to processes run by the front-end device when sending the first keep-alive information;

generating second verification information by using device feature information and second process feature information corresponding to the ID;

judging whether the first verification information matches the second verification information, and confirming that the front-end device is running normally when the judgment result is yes, and confirming that an abnormality has occurred in the front-end device when the judgment result is no.

It can be seen that the technical solution of the present application is applied such that the NVR receives first keep-alive information from the front-end device, wherein the first keep-alive information carries the first verification information, and the first verification information is generated according to the processes run by the front-end device when sending the first keep-alive information, the NVR sends the first verification information to the video server with the first verification information carried in second keep-alive information, and then the video server can determine, according to the first verification information and second verification information on the front-end device, whether an abnormality has occurred in the front-end device, wherein the second verification information is generated according to processes running on the front-end device in a normal running status. The solution solves the problem that the video server cannot timely discover whether an abnormality has occurred in a front-end device, and enhances the network stability while reducing additional manual operations.

DETAILED DESCRIPTION OF EMBODIMENTS

As described in the Background Art, many of the existing video surveillance systems adopt a dual-network-interface-card dual-IP scheme for an NVR. Since one of the IPs is connected to a video management platform, and the other IP is connected to some IPCs subordinate to the NVR, the video server cannot directly and actively acquire the running status of each IPC under such network architecture, which leads to problems in stability and security of the network.

In view of the problems in the prior art, the present application proposes an abnormality detection method on the basis of the dual-network-interface-card scheme, in which an intermediate NVR gathers special keep-alive information from a front end and transmits the information in keep-alive information between the NVR and a video server, so as to solve the problem that the video server cannot judge whether the front-end device is running normally by actively collecting the status of the front end.

Figure 2:
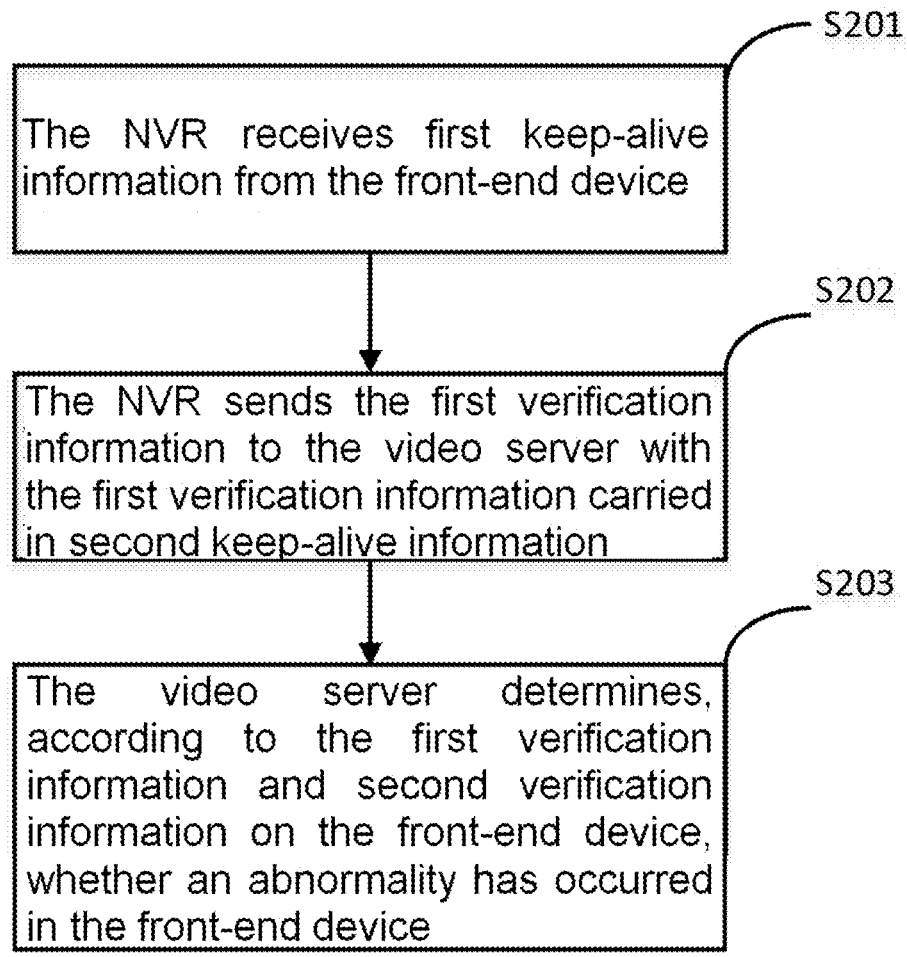
FIG. 2 is a schematic flowchart of an abnormality detection method according to an embodiment of the present application.

As shown in FIG. 2, the method comprises following steps:

S201: receiving, by the NVR, first keep-alive information from the front-end device, wherein the first keep-alive information carries first verification information, and the first verification information is generated according to processes run by the front-end device when sending the first keep-alive information.

An object of the present application is to enable the video server to timely know whether the front-end device is in a normal running status. Therefore in order to achieve the technical objective, in the technical solution of the present application, the front-end device is caused to generate first verification information capable of reflecting processes currently running on the front-end device based on its processes when the keep-alive information is sent, wherein the verification information is carried in a keep-alive message between the NVR and the front-end device and sent to the NVR. Since the processes under normal running conditions of the front-end device are all known and predictable, the contents of running processes reflected by the verification information sent from the front-end device is known as long as the front-end device is in a normal working status. In the technical solution of the present application, special security processing is performed on the processes run by the front-end device when sending the first keep-alive information, so that uniquely corresponding first verification information is generated therefrom, in order to prevent a lawbreaker from directly capturing packets from the processes of the front-end device to make the process normally running on the front-end device leaked.

On this basis, in the technical solution of the present application, the front-end device carries the above-mentioned first verification information using a keep-alive message, so that the video server side can timely discover, by comparison, whether the device is in the normal running status.

In an optional embodiment of the present application, in order to ensure communication security, verification information generated from information related to processes run by the front-end device when sending the keep-alive information as well as information on processes allowed in the normal running status of the front-end device is transmitted by the front-end device to the video server via the NVR. In this optional embodiment, the verification information may be generated by the front-end device using a hash operation based on the moment at which the keep-alive information is sent, device feature information (value) of the front-end device, and process feature information. In this way, even if the verification information is captured by a lawbreaker, any content cannot be acquired therefrom.

Optionally, the first verification information calculated by the front-end device and second verification information calculated by the video server are generated depending on different types in following modes:

(1) The front-end device generates the first verification information by using a hash operation according to the sending time, device feature information on the front-end device, and the first process feature information, wherein the device feature information is corresponding to the device information on the front-end device, and the first process feature information is corresponding to processes run by the front-end device when sending the first keep-alive information;

(2) the video server generates the second verification information by using a hash operation according to the sending time, the device feature information, and the second process feature information, wherein the second process feature information is corresponding to processes running on the front-end device in a normal running status.

It should be noted that although the sending time and the device feature value are introduced into the above procedure of generation of the verification information for the hash operation, they are not the only variables, and the skilled person may also use other factors in combination with the process feature information to perform a specified operation to generate the verification information as long as the timing of the processes allowed by the front-end device and the uniqueness of the front-end device can be uniquely characterized, and these factors all fall within the scope of protection of the present application.

In order to generate verification information capable of accurately reflecting the state of the processes running on the front-end device and enable the verification information to be securely carried in a keep-alive message after being encrypted, in an optional embodiment of the present application, firstly a hash operation is performed on information on processes normally running on the front-end device to generate the process feature information as described above (the first process feature information is generated according to processes running when the front-end device sends the keep-alive information, and the second process feature information is generated according to processes allowed when the front-end device is running normally).

During a specific implementation, the process feature information may be generated in various modes, and for example, may be generated based on the process status after all the processes are sorted (or ranked) in accordance with their names, or generated by firstly classifying the processes in accordance with the types of the processes and then selecting and processing one type of processes or all the processes in accordance with the classification result, but it is necessary to preset in the front-end device a unified generation mode for the process feature information to ensure that the process feature information is generated in a consistent mode for previous and subsequent processes regardless which one of the above-mentioned modes is adopted.

In the existing classification mode, the types of processes occurring during the normal running of the front-end device in an actual application scenario may be divided into basic processes and dynamic processes. In an optional embodiment of the present application, the process status information on each process is firstly sorted in accordance with the name of the respective process, and then the sorted process status information is evaluated using a hash operation. Simply speaking, hash is a function that compresses a message of any length into a message digest of fixed length. For example, H(info1)=key1, H(info2)=key2, and if info1!=info2, then key1!=key2. MD5 is a common hash operation, by which a different key value is obtained even if a single digit of the info is changed. Based on this characteristic, a hash value obtained according to the process status information on the front-end device in the normal running status does not change. Therefore, in an example of the present application, the first process feature information and the second process feature information may be generated after a hash operation is performed according to the sorted process status information on the basic processes and the dynamic processes.

It should be noted that although the verification information and the process feature information have been described in the above optional embodiments in such a manner that processes are divided into dynamic processes and basic processes, and the processes are sorted using the name as a factor during the generation of the verification information, the present disclosure is not limited thereto, and the skilled person may make other improvements or adopt other generation modes as long as the status of the processes can be accurately reflected, and these improvements and generation modes should all fall within the scope of protection of the present application.

As described previously, the first process feature information is capable of reflecting a process currently running on the front-end device. In order to enable the video server to confirm, by comparison, whether an abnormality has occurred in the front-end device (i.e., whether the processes has changed), a hash value obtained from processes of the front-end device in the normal running status (referred to as the second process feature information in the present application) needs to be set in the video server, and the process feature information and other factors (such as time, device information, etc.) are combined to further obtain verification information by a hash operation so as to ensure that a packet cannot be completely cracked even if the package is captured by a lawbreaker.

In an optional embodiment of the present application, before implementing the solution comprising the above steps of the present application, initialization processing of the device information and time are performed by following steps:

Step a): acquiring, by the NVR, second process feature information on the front-end device;

Step b): saving, by the NVR, the second process feature information corresponding to device feature information on the front-end device, wherein the the second process feature information and the device feature information are reported when the front-end device registers with the NVR for the first time after the front-end device is discovered by the NVR;

Step c): sending, by the NVR, the device feature information and the second process feature information to the video server while pushing the front-end device to the video server;

Step d): performing, by the NVR, time synchronization with the front-end device and the video server.

For the front-end device, the device information thereof includes various types, such as manufacturer information, device type, device model, device serial number, device hardware version, device software version, etc. In all the existing video surveillance networks, there are a huge number of front-end devices, thus the device information on the front-end devices may coincide when any type of the above device information is to be paired with a single front-end device. In order to avoid this situation, in an optional embodiment of the present application, special processing (for example, MD5 digest value processing) is performed on all the device information on a certain front-end device to generate device feature information uniquely corresponding to the front-end device. In addition, in the optional embodiment of the present application described above, the hash operation of the verification information needs to be performed based on the time at which the keep-alive message is sent. In order to ensure time consistency between the front-end device, the NVR, and the video server in the system, in an optional embodiment of the present application, the NVR needs to maintain time synchronization with the front-end device and the video server after acquiring the device information on the front-end device is acquired when the front-end device is registered.

S202: sending, by the NVR, the first verification information to the video server with the first verification information carried in second keep-alive information.

S203: determining, by the video server, according to the first verification information and second verification information on the front-end device, whether an abnormality has occurred in the front-end device, wherein the second verification information is generated according to processes running on the front-end device in a normal running status.

After receiving the first process feature information sent from the front-end device via the keep-alive information, the NVR sends the first process feature information to the video server via keep-alive information between the NVR and the video server, and the video server compares and matches the first process feature information with the second process feature information on the front-end device so as to confirm whether an abnormality has occurred in the front-end device.

As already mentioned above, the front-end device generates verification information based on its current hash value, and attaches the verification information to a keep-alive message and transmits the message to the NVR, and the NVR attaches, to the keep-alive message between the NVR and the video server, the verification information and a factor (e.g., sending time) for generating the hash information, as well as a retrieval factor (e.g., ID) for retrieving process feature information on the front-end device in the normal status. Based on the hash information saved by the server, if the verification information does not match verification information generated from the front-end device in the normal running status (the verification information is generated by the video server based on the process feature information on the front-end device in the normal running status), it is considered that an abnormality has occurred in the device.

In an optional embodiment of the present application, the video server performs a verification by the following procedures:

Step a): extracting an ID and a sending time carried in the second keep-alive information;

Step b): generating the second verification information by using the sending time, and device feature information and second process feature information corresponding to the ID;

Step c): judging whether the first verification information matches the second verification information;

confirming that the front-end device is running normally if the first verification information matches the second verification information; and confirming that an abnormality has occurred in the front-end device if the first verification information and the second verification information do not match with each other.

It can be seen that the technical solution of the present application is applied such that the NVR receives the first keep-alive information from the front-end device, wherein the first keep-alive information carries the first verification information, and the first verification information is generated according to processes run by the front-end device when sending the first keep-alive information, the NVR sends the first verification information to the video server with the first verification information carried in the second keep-alive information, and then the video server can determine, according to the first verification information and second verification information on the front-end device, whether an abnormality has occurred in the front-end device, wherein the second verification information is generated according to processes running on the front-end device in the normal running status. The solution solves the problem that the video server cannot timely discover whether an abnormality has occurred in a front-end device, and enhances the network stability while reducing additional manual operations.

Figure 1:
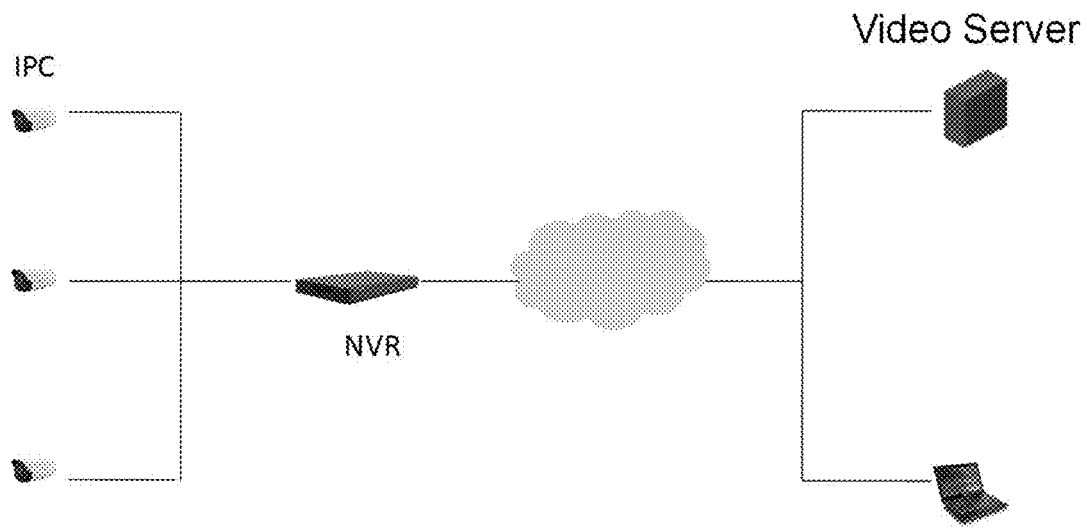
FIG. 1 is a schematic diagram of a dual-network-interface-card dual IP scheme for an NVR in the prior art.
Figure 3:
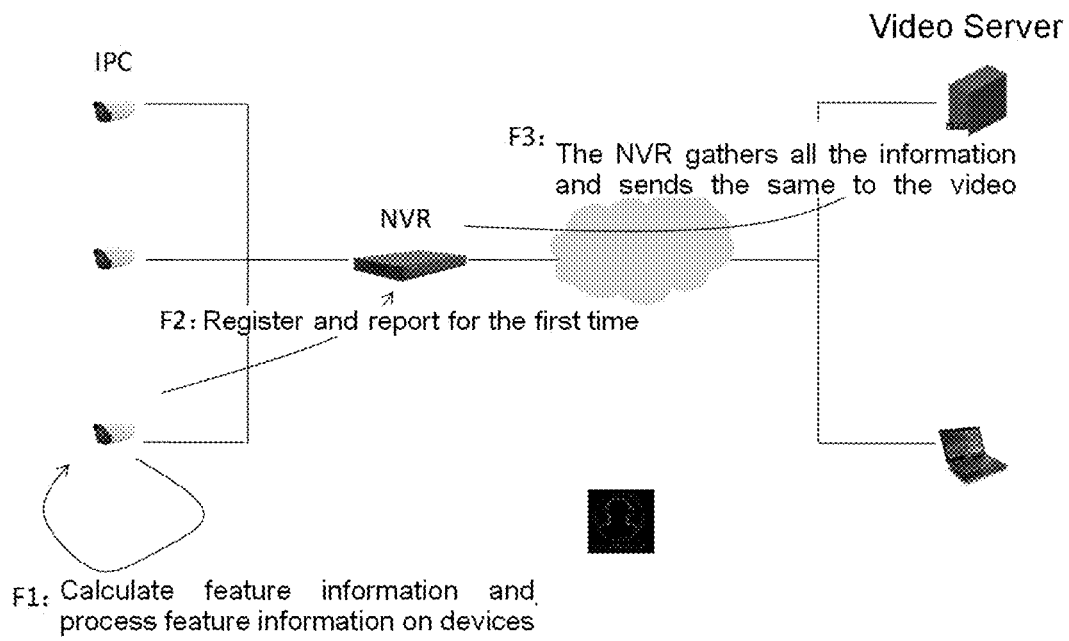
FIG. 3 is a schematic diagram showing determination of device feature information and process feature information on a front-end device in an example of the present application.
Figure 4:
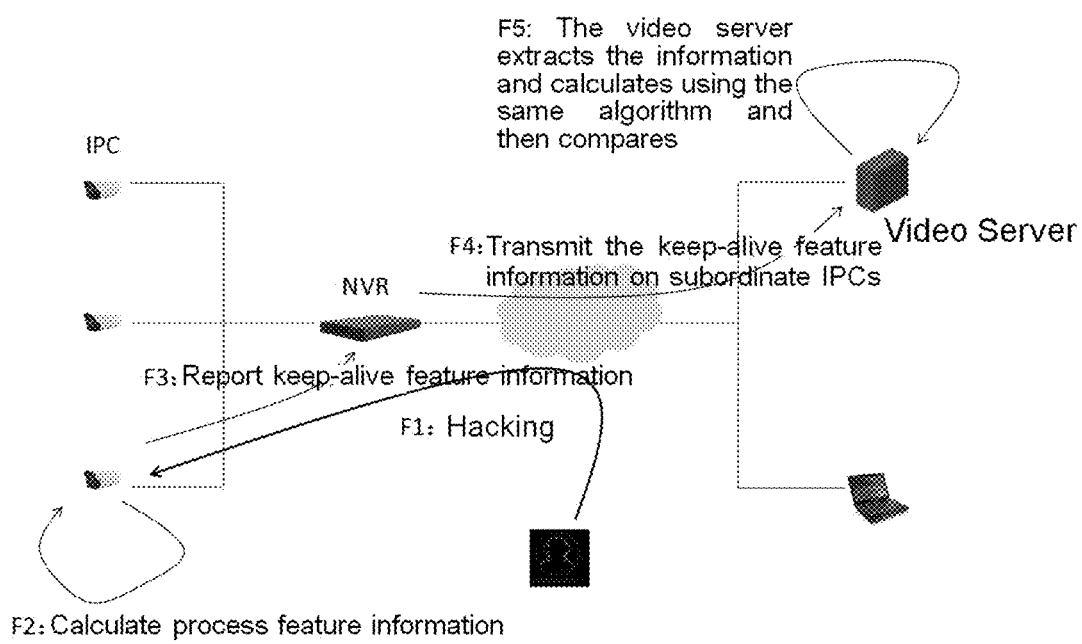
FIG. 4 is a schematic diagram showing determination of process feature information in an example of the present application.

In order to further illustrate the technical idea of the present disclosure, the technical solution of the present disclosure will be described in connection with the application scenario shown in FIG. 1. The video surveillance system comprises video surveillance devices such as a video server, an NVR, and front-end IPCs. As shown in FIGS. 3 and 4, the steps of the optional embodiment are as follows:

Step a): adding, by the NVR, an IPC managed by the NVR by searching.

Step b): reporting, by the IPC to the NVR, after the IPC is discovered by the NVR, the device feature information (value) of the IPC that uniquely identifies the IPC when the IPC registers with the NVR for the first time, wherein the device feature value may be an md5 digest value IPC_info_md5 made of device feature information such as manufacturer information, device type, device model, device serial number, device hardware version, and device software version of the IPC.

Step c): reporting, by the IPC to the NVR, process feature information generated when it is running normally.

In a specific application scenario, the process status information generated when the device is running normally may contain following two parts:

The basic process information table_normal generated when the IPC is running normally is as shown in Table 1 below:

TABLE 1

| Process Name | Process Status |
|---|---|
| Thread1 | Status1 |
| Thread2 | Status2 |
| ... | |

A process table_dynamic that may occur dynamically as the service changes during the running of the IPC device is as shown in Table 2 below:

TABLE 2

| Process Name | Process Status |
|---|---|
| DyThread1 | DyStatus1 |
| DyThread2 | DyStatus2 |
| ... | |

Since the table_normal remains unchanged during normal running of the device, and the table_dynamic may predictable with the occurrence of service scheduling, for example, the processes Dythread1, Dythread2, and Dythread3 may only occur during running, and the statuses of the three processes are all definite. Therefore, in the present example, all the process information and status information in table_normal and table_dynamic are sorted in accordance with the process name, and then a hash operation is performed so as to obtain a piece of process feature information. An example is given as follows: md5 (Thread1 Status1 Thread2 Status2 Thread3 Status3 DyThread1 DyStatus1 DyThread2 DyStatus2)=IPC_pro_md5.

Step d): saving, by the NVR, the feature information corresponding to the front-end device, which may be saved in the form of table_info. Reference can be made to Table 3 for the specific save form:

TABLE 3

| ID  | MAC  | Device Feature Value | Process Feature Value |
|-----|------|----------------------|-----------------------|
| ID1 | MAC1 | IPC1_info_md5        | IPC1_pro_md5          |
| ID2 | MAC2 | IPC2_info_md5        | IPC2_pro_md5          |
| ... |      |                      |                       |

Step e): attaching, by the NVR, the table information table_info when the NVR is pushing the camera to the video server, so that the information of table_info of each IPC subordinate to the NVR is obtained by the video server.

Step f): performing, by the IPC, the NVR, and the video server, time synchronization during the first time of registering, so that there is a time consistency between the three devices.

Step g): carrying, by the IPC during the subsequent periodic keep-alive procedure between the IPC and the NVR, following content in the keep-alive information:
keepalive_md5=md5(time, IPC_pro_md5, IPC_info_md5);
wherein time is variable, and IPC_pro_md5 is obtained by real-time processing according to the current process status of the IPC, so that when a failure occurs in the running of the IPC itself or the IPC is hacked by a hacker, the table_normal and the table_dynamic running on the IPC will change, and the value of IPC_pro_md5 obtained upon a hash operation using the same hash operation will also differ from the result obtained during normal running.

Step h): gathering, by the NVR, the information (ID, keepalive_md5, time) on the IPC managed by the NVR in a keep-alive message between the NVR and the video server and sends the message to the video server.

For example, it is assumed that the NVR in the video surveillance network manages eight IPCs. Since the NVR periodically reports to the video server, if keep-alive information sent from only five IPCs is gathered at the reporting time when the NVR reports to the video server, only the information about the five IPCs is contained in the keep-alive message sent by the NVR to the video server.

Step i): extracting, by the video server, the ID, keepalive_md5, and time from the message, and combining them with table_info, wherein the video server firstly reads, according to the ID in the message, the device feature value IPC_info_md5 and the process feature value IPC_pro_md5 corresponding to the ID from the table_info, and then compares the Md5(time, IPC_pro_md5, IPC_info_md5) with the keepalive_md5 extracted from the message, and if the two values are equal to each other, it is proven that the IPC is running normally, and then the NVR is notified that the IPC is running normally, so that keep-alive can be continued subsequently.

Step j): notifying the user by an alarm if it is judged in the previous step that the two values are not equal which indicates that the IPC is running abnormally, and notifying the NVR that the information is abnormal, wherein the IPC is processed by the NVR according to policy, and for example is forced be offline.

With the technical solution of the above example, the network adaptability is better, and it can be avoided that the status of the front end cannot be acquired by active collection when the front-end device is of a complex NAT (Network Address Translation) networking type; when a lawbreaker takes control of the IPC, the processes on the IPC changes, and the video server will not be spoofed if the lawbreaker constructs a certain fixed keep-alive message only according to packets captured at a certain moment, whereby the stability and security of the network are ensured.

An embodiment of the present application further provides an abnormality detection method, which is applicable to a network video recorder (NVR) that is in communication with a video server and a front-end device, the method comprising:

receiving, by the NVR, first keep-alive information from the front-end device, wherein the first keep-alive information carries first verification information, and the first verification information is generated according to processes run by the front-end device when sending the first keep-alive information; and sending, by the NVR, the first verification information to the video server with the first verification information carried in second keep-alive information, so that the video server determines, according to the first verification information and second verification information on the front-end device, whether an abnormality has occurred in the front-end device;

wherein the second verification information is generated according to processes running on the front-end device in a normal running status.

In the present embodiment, optionally, the method further comprises:

acquiring, by the NVR, the second process feature information on the front-end device, and saving the second process feature information and device feature information on the front-end device corresponding to the second process feature information, wherein the second process feature information and the device feature information are reported when the front-end device registers with the NVR for the first time after the front-end device is discovered by the NVR;

sending, by the NVR, the device feature information and the second process feature information to the video server while pushing the front-end device to the video server; and performing, by the NVR, time synchronization with the front-end device and the video server.

Reference can be made to the embodiment involving multi-end interaction for a detailed description of each of the above steps, and thus a repeated description thereof is omitted here.

An embodiment of the present application further provides an abnormality detection method, which is applicable to a video server that is in communication with a front-end device and a network video recorder (NVR), wherein a corresponding relation between an ID, device feature information, and second process feature information on the front-end device is stored in the video server, the method comprising:

extracting, by the video server, when second keep-alive information from the NVR is received, an ID and first verification information carried in the second keep-alive information, wherein the first verification information is generated according to processes run by the front-end device when sending the first keep-alive information;

generating, by the video server, second verification information by using device feature information and the second process feature information corresponding to the ID;

judging, by the video server, whether the first verification information matches the second verification information, and confirming that the front-end device is running normally when the judgment result is yes, and confirming that an abnormality has occurred in the front-end device when the judgment result is no.

Optionally, in the present embodiment, the method further comprises steps of:

pre-storing a corresponding relation between an ID, device feature information, and the second process feature information on the front-end device in the video server, wherein the second process feature information is corresponding to processes running on the front-end device in a normal running status, and the device feature information is corresponding to device information on the front-end device.

Optionally, in the present embodiment, in a case where a moment at which the front-end device sends the first keep-alive information is used as sending time, the method further comprises steps of:

generating, by the video server, the second verification information by using a hash operation according to the sending time, the device feature information, and the second process feature information, wherein the second process feature information is corresponding to processes running on the front-end device in a normal running status.

Reference can be made to the embodiment involving multi-end interaction for a detailed description of each of the above steps, and thus a repeated description thereof is omitted here.

Figure 5:
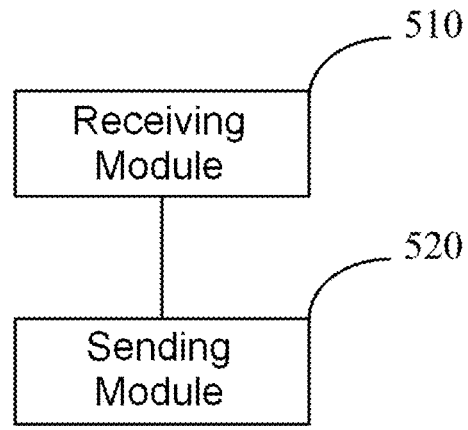
FIG. 5 is a schematic structural diagram of an NVR according to an embodiment of the present application.

In order to achieve the above technical object, an embodiment of the present application further provides an NVR, which is applicable to a video surveillance system comprising a video server, the NVR, and a front-end device, as shown in FIG. 5, the NVR comprising:

a receiving module 510 configured to receive first keep-alive information from the front-end device, wherein the first keep-alive information carries first verification information, and the first verification information is generated according to processes run by the front-end device when sending the first keep-alive information; and a sending module 520 configured to send the first verification information to the video server with the first verification information carried in second keep-alive information, so that the video server determines, according to the first verification information and second verification information on the front-end device, whether an abnormality has occurred in the front-end device;

wherein the second verification information is generated according to processes running on the front-end device in a normal running status.

A specific application scenario, where a moment at which the front-end device sends the first keep-alive information is used as sending time, further comprises:

generating, by the front-end device, the first verification information by using a hash operation according to the sending time, the device feature information on the front-end device, and the first process feature information, wherein the device feature information is corresponding to device information on the front-end device, and the first process feature information is corresponding to processes run by the front-end device when sending the first keep-alive information; and generating, by the video server, the second verification information by using a hash operation according to the sending time, the device feature information, and the second process feature information, wherein the second process feature information is corresponding to processes running on the front-end device in a normal running status.

In a specific application scenario, the types of the process include basic processes and dynamic processes:

wherein the first process feature information and the second process feature information are generated after a hash operation is performed according to the sorted process status information on the basic processes and the dynamic processes.

In a specific application scenario, the NVR further comprises:

an initialization module configured to acquire the second process feature information on the front-end device, and save the second process feature information corresponding to device feature information on the front-end device, wherein the second process feature information and the device feature information are reported when the front-end device registers with the NVR for the first time after front-end device is discovered by the NVR;

a pushing module configured to send the device feature information and the second process feature information to the video server while pushing the front-end device to the video server; and a synchronization module configured to perform time synchronization with the front-end device and the video server.

Figure 6:
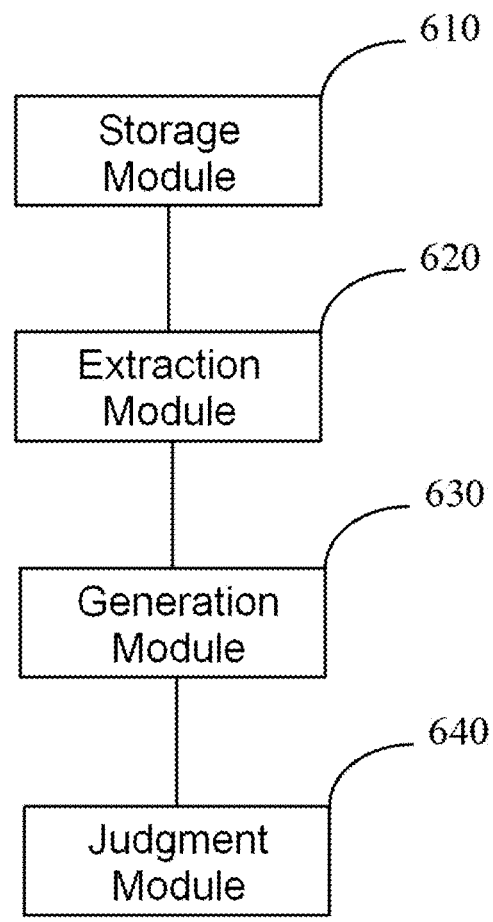
FIG. 6 is a schematic structural diagram of a video server according to an embodiment of the present application.

Correspondingly, an embodiment of the present application further provides a video server, which is applicable to a video surveillance system comprising a network video recorder (NVR), the video server, and a front-end device, as shown in FIG. 6, the video server comprising:

a storage module 610 configured to store a corresponding relation between an ID, device feature information, and second process feature information on the front-end device, wherein the second process feature information is corresponding to processes running on the front-end device in a normal running status, and the device feature information is corresponding to device information on the front-end device;

an extraction module 620 configured to extract, when second keep-alive information from the NVR is received, an ID and first verification information carried in the second keep-alive information, wherein the first verification information is generated according to processes run by the front-end device when sending the first keep-alive information;

a generation module 630 configured to generate the second verification information by using the device feature information and the second process feature information corresponding to the ID; and a judgment module 640 configured to judge whether the first verification information matches the second verification information, and confirming that the front-end device is running normally when the judgment result is yes, and confirming that an abnormality has occurred in the front-end device when the judgment result is no.

An embodiment of the present application further provides a video server, which is applicable to a video surveillance system comprising a network video recorder (NVR), the video server, and a front-end device, wherein a corresponding relation between an ID, device feature information, and second process feature information on the front-end device is stored in the video server, the video server comprising:

an extraction module configured to extract, when second keep-alive information from the NVR is received, an ID and first verification information carried in second keep-alive information, wherein the first verification information is generated according to processes run by the front-end device when sending the first keep-alive information;

a generation module configured to generate the second verification information by using device feature information and the second process feature information corresponding to the ID; and a judgment module configured to judge whether the first verification information matches the second verification information, and confirming that the front-end device is running normally when the judgment result is yes, and confirming that an abnormality has occurred in the front-end device when the judgment result is no.

Optionally, in the present embodiment, the video server further comprises:

a storage module configured to pre-store a corresponding relation between the ID, the device feature information, and the second process feature information on the front-end device in the video server, wherein the second process feature information is corresponding to processes running on the front-end device in a normal running status, and the device feature information is corresponding to device information on the front-end device.

Optionally, in the present embodiment, the video server further comprises an operation module, and in a case where a moment at which the front-end device sends the first keep-alive information is used as sending time, the operation module is configured to generate the second verification information by a hash operation according to the sending time, the device feature information, and the second process feature information, wherein the second process feature information is corresponding to processes running on the front-end device in a normal running status.

Reference can be made to the corresponding steps for the specific procedures of implementation of the above-mentioned respective functional modules, and thus a repeated description thereof is omitted here.

An embodiment of the present disclosure further provides a network video recorder (NVR), which is applicable to a video surveillance system comprising a video server, the NVR, and a front-end device, wherein the NVR comprises: a processor and a memory, the memory is coupled to the processor, instructions are stored in the memory, and when the instructions are executed by the processor, the NVR is caused to execute following operations:

receiving first keep-alive information from the front-end device, wherein the first keep-alive information carries first verification information, and the first verification information is generated according to processes run by the front-end device when sending the first keep-alive information; and sending the first verification information to the video server with the first verification information carried in second keep-alive information, so that the video server determines, according to the first verification information and second verification information on the front-end device, whether an abnormality has occurred in the front-end device;

wherein the second verification information is generated according to processes running on the front-end device in a normal running status.

In the present embodiment, optionally, the NVR further executes following operations:

acquiring second process feature information on the front-end device, and saving the second process feature information and device feature information on the front-end device corresponding to the second process feature information, wherein the second process feature information and the device feature information are reported when the front-end device registers with the NVR for the first time after the front-end device is discovered by the NVR;

sending the device feature information and the second process feature information to the video server while pushing the front-end device to the video server; and performing time synchronization with the front-end device and the video server.

An embodiment of the present disclosure further provides a video server, which is applicable to a video surveillance system comprising a network video recorder (NVR), the video server, and a front-end device, wherein the video server comprises: a processor and a memory, the memory is coupled to the processor, instructions are stored in the memory, when the instructions are executed by the processor, the video server is caused to execute following operations:

extracting, when second keep-alive information from the NVR is received, an ID and first verification information carried in the second keep-alive information, wherein the first verification information is generated according to processes run by the front-end device when sending the first keep-alive information;

generating the second verification information by using device feature information and second process feature information corresponding to the ID; and judging whether the first verification information matches the second verification information, and confirming that the front-end device is running normally when the judgment result is yes, and confirming that an abnormality has occurred in the front-end device when the judgment result is no.

Those skilled in the art can clearly appreciate from the description of the above embodiments that the present disclosure may be implemented by hardware, or may be implemented by software plus a necessary general-purpose hardware platform. Based on such understanding, the technical solution of the present disclosure may be embodied in the form of a software product, which may be stored in a non-volatile storage medium (which may be a CD-ROM, a USB flash disk, a mobile hard disk, or the like), including a number of instructions for causing a computer device (which may be a personal computer, a server, a network device, or the like) to execute the methods described in various implementation scenarios of the present disclosure.

Those skilled in the art can understand that the drawings are merely schematic diagrams showing an optional implementation scenario, and the modules or procedures in the drawings are not necessarily required for implementing the present disclosure.

Those skilled in the art can understand that modules in an apparatus in an implementation scenario may be distributed in the apparatus of the implementation scenario in accordance with the description of the implementation scenario, or may be correspondingly changed to be located in one or more apparatuses different from the present implementation scenario. The modules of the implementation scenario described above may be combined into one module, or may be further split into multiple sub-modules.

The serial numbers described above in the present disclosure are merely intended to be descriptive, and do not represent the advantages and disadvantages of the implementation scenarios.

Only several specific implementation scenarios of the present disclosure are disclosed above, but the present disclosure is not limited thereto, and any changes that can be envisaged by those skilled in the art shall fall within the scope of protection of the present disclosure.

INDUSTRIAL APPLICABILITY

The technical solution of the present application is applied so that the video server can timely discover whether an abnormality has occurred in the front-end device, and network stability is enhanced while reducing additional manual operations.

What is claimed is:

1. An abnormality detection method for a video surveillance system comprising a video server, a network video recorder (NVR), and a front-end device, wherein a corresponding relation between an ID, device feature information, and second process feature information on the front-end device is stored in the video server, the abnormality detection method comprising steps of:

receiving, by the NVR, first keep-alive information from the front-end device, wherein the first keep-alive information carries first verification information, and the first verification information is generated according to processes run by the front-end device when sending the first keep-alive information;

sending, by the NVR, the first verification information to the video server with the first verification information carried in second keep-alive information;

extracting, by the video server when second keep-alive information from the NVR is received, the ID and first verification information carried in the second keep-alive information;

generating, by the video server, second verification information by using the device feature information and the second process feature information corresponding to the ID;

determining, by the video server, according to the first verification information and the second verification information on the front-end device, whether an abnormality has occurred to the front-end device, wherein the second verification information is generated according to processes running on the front-end device in a normal running status; and judging, by the video server, whether the first verification information matches the second verification information, and confirming that the front-end device is running normally when the judgment result is yes, and confirming that an abnormality has occurred in the front-end device when the judgment result is no.

2. The method according to claim 1, wherein the method further comprises steps of:

calculating the first verification information by the front-end device; and calculating the second verification information by the video server.

3. The method according to claim 2, wherein in a case where a moment at which the front-end device sends the first keep-alive information is used as sending time, the step of calculating the first verification information by the front-end device comprises:

generating, by the front-end device, the first verification information by using a hash operation according to the sending time, device feature information on the front-end device, and the first process feature information, wherein the first process feature information is corresponding to processes run by the front-end device when sending the first keep-alive information.

4. The method according to claim 2, wherein in the case where the moment at which the front-end device sends the first keep-alive information is used as the sending time, the step of calculating the second verification information by the video server comprises:

generating, by the video server, the second verification information by using a hash operation according to the sending time, the device feature information, and the second process feature information, wherein the second process feature information is corresponding to processes running on the front-end device in the normal running status.

5. The method according to claim 4, wherein types of the processes include basic processes and dynamic processes, wherein the first process feature information is generated after a hash operation is performed according to sorted process status information on the basic processes and the second process feature information is generated after a hash operation is performed according to sorted process status information on the dynamic processes.

6. The method according to claim 5, wherein before the step of receiving by the NVR first keep-alive information from the front-end device, the method further comprises steps of:

acquiring, by the NVR, the second process feature information on the front-end device;

saving, by the NVR, the second process feature information and the device feature information on the front-end device corresponding to the second process feature information, wherein the second process feature information and the device feature information are reported when the front-end device registers with the NVR for the first time after the front-end device is discovered by the NVR;

sending, by the NVR, the device feature information and the second process feature information to the video server while pushing the front-end device to the video server; and performing, by the NVR, time synchronization with the front-end device and the video server.

7. The method according to claim 6, further comprising steps of:

acquiring, by the NVR, second process feature information on the front-end device, and saving the second process feature information and the device feature information on the front-end device corresponding to the second process feature information, wherein the second process feature information and the device feature information are reported when the front-end device registers with the NVR for the first time after the front-end device is discovered by the NVR;

sending, by the NVR, the device feature information and the second process feature information to the video server while pushing the front-end device to the video server; and performing, by the NVR, time synchronization with the front-end device and the video server.

8. The method according to claim 5, wherein the second keep-alive information further contains the sending time and the ID of the front-end device, and the step of determining by the video server according to the first verification information and second verification information on the front-end device whether an abnormality has occurred in the front-end device comprises steps of:

extracting the ID and the sending time carried in the second keep-alive information; and generating the second verification information by using the sending time, and the device feature information and the second process feature information corresponding to the ID.

9. The method according to claim 1, further comprising:
pre-storing a corresponding relation between the ID, the device feature information, and the second process feature information on the front-end device in the video server, wherein the second process feature information is corresponding to processes running on the front-end device in a normal running status, and the device feature information is corresponding to device information on the front-end device.

10. The method according to claim 1, wherein in a case where a moment at which the front-end device sends the first keep-alive information is used as sending time, the method further comprises:
generating, by the video server, the second verification information by using a hash operation according to the sending time, the device feature information, and the second process feature information.

11. A video surveillance system comprising a video server, a network video recorder (NVR), and a front-end device, wherein the video surveillance system is configured to execute an abnormality detection method for a video surveillance system comprising a video server, a network video recorder (NVR), and a front-end device, wherein a corresponding relation between an ID, device feature information, and second process feature information on the front-end device is stored in the video server, the abnormality detection method comprising steps of:
receiving, by the NVR, first keep-alive information from the front-end device, wherein the first keep-alive information carries first verification information, and the first verification information is generated according to processes run by the front-end device when sending the first keep-alive information;
sending, by the NVR, the first verification information to the video server with the first verification information carried in second keep-alive information;
extracting, by the video server when second keep-alive information from the NVR is received, the ID and first verification information carried in the second keep-alive information;
generating, by the video server, second verification information by using the device feature information and the second process feature information corresponding to the ID;
determining, by the video server, according to the first verification information and second verification information on the front-end device, whether an abnormality has occurred to the front-end device, wherein the second verification information is generated according to processes running on the front-end device in a normal running status; and
judging, by the video server, whether the first verification information matches the second verification information, and confirming that the front-end device is running normally when the judgment result is yes, and confirming that an abnormality has occurred in the front-end device when the judgment result is no,
wherein a corresponding relation between the ID, device feature information, and second process feature information on the front-end device is stored in the video server, the video server comprising:

an extraction module configured to extract, when second keep-alive information from the NVR is received, the ID and first verification information carried in the second keep-alive information, wherein the first verification information is generated according to processes run by the front-end device when sending the first keep-alive information;
a generation module configured to generate the second verification information by using the device feature information and the second process feature information corresponding to the ID; and
a judgment module configured to judge whether the first verification information matches the second verification information, and confirming that the front-end device is running normally when the judgment result is yes, and confirming that an abnormality has occurred in the front-end device when the judgment result is no.

12. The video surveillance system according to claim 11, wherein the NVR comprises:
a receiving module configured to receive first keep-alive information from the front-end device, wherein the first keep-alive information carries first verification information, and the first verification information is generated according to processes run by the front-end device when sending the first keep-alive information; and
a sending module configured to send the first verification information to the video server with the first verification information carried in second keep-alive information, so that the video server determines, according to the first verification information and second verification information on the front-end device, whether an abnormality has occurred in the front-end device,
wherein the second verification information is generated according to a process running on the front-end device in a normal running status.

13. The video surveillance system according to claim 12, wherein the NVR further comprises:
an initialization module configured to acquire second process feature information on the front-end device, and save the second process feature information corresponding to device feature information on the front-end device, wherein the device information is reported when the front-end device registers with the NVR for the first time after the front-end device is discovered by the NVR;
a pushing module configured to send the device feature information and the second process feature information to the video server while pushing the front-end device to the video server; and
a synchronization module configured to perform time synchronization with the front-end device and the video server.

14. The video surveillance system according to claim 11, wherein the video server further comprises:
a storage module configured to pre-store a corresponding relation between the ID, the device feature information, and the second process feature information on the front-end device in the video server, wherein the second process feature information is corresponding to processes running on the front-end device in a normal running status, and the device feature information is corresponding to device information on the front-end device.

15. The video surveillance system according to claim 11, wherein the video server further comprises an operation module, wherein the operation module is configured to, in a case where a moment at which the front-end device sends the first keep-alive information is used as sending time,
  generate the second verification information by a hash operation according to the sending time, the device feature information, and the second process feature information.

16. The video surveillance system according to claim 11, wherein the NVR comprises:
  a processor and a memory, the memory is coupled to the processor, and the memory stores instructions that cause, when executed by the processor, the NVR to execute following operations:
  receiving first keep-alive information from the front-end device, wherein the first keep-alive information carries first verification information, and the first verification information is generated according to processes run by the front-end device when sending the first keep-alive information; and
  sending the first verification information to the video server with the first verification information carried in second keep-alive information, so that the video server determines, according to the first verification information and second verification information on the front-end device, whether an abnormality has occurred in the front-end device,
  wherein the second verification information is generated according to processes running on the front-end device in a normal running status.

17. The video surveillance system according to claim 16, wherein the NVR further executes the following operations:
  acquiring second process feature information on the front-end device, and saving the second process feature information and device feature information on the front-end device corresponding to the second process feature information, wherein the second process feature information and the device feature information are reported when the front-end device registers with the NVR for the first time after the front-end device is discovered by the NVR;
  sending the device feature information and the second process feature information to the video server while pushing the front-end device to the video server; and
  performing time synchronization with the front-end device and the video server.

18. The video surveillance system according to claim 11, wherein the video server comprises:
  a processor and a memory, the memory is coupled to the processor, and the memory stores instructions that cause, when executed by the processor, the video server to execute the following operations:
  extracting, when second keep-alive information from the NVR is received, the ID and first verification information carried in the second keep-alive information, wherein the first verification information is generated according to processes run by the front-end device when sending the first keep-alive information;
  generating the second verification information by using the device feature information and second process feature information corresponding to the ID; and
  judging whether the first verification information matches the second verification information, and confirming that the front-end device is running normally when the judgment result is yes, and confirming that an abnormality has occurred in the front-end device when the judgment result is no.

* * * * *